United States Patent [19]

Ogura

[11] Patent Number: 4,821,123
[45] Date of Patent: Apr. 11, 1989

[54] MAGNETIC RECORDING OR REPRODUCTION APPARATUS WITH ERASING CAPABILITY

[75] Inventor: Tokihiko Ogura, Kanagawa, Japan
[73] Assignee: Canon Kabushiki Kaisha, Tokyo, Japan
[21] Appl. No.: 901,187
[22] Filed: Aug. 28, 1986

[30] Foreign Application Priority Data
Aug. 31, 1985 [JP] Japan .................. 60-192473

[51] Int. Cl.⁴ .............................................. G11B 5/03
[52] U.S. Cl. ...................................... 360/66; 360/33.1; 358/310; 358/335
[58] Field of Search ............... 360/33.1, 64, 118, 37.1, 360/66; 358/335, 342, 310, 330, 319, 326

[56] References Cited

U.S. PATENT DOCUMENTS

| 3,829,896 | 8/1974 | Brock | 360/66 |
| 4,301,466 | 11/1981 | Lemoine | 358/310 |
| 4,717,975 | 1/1988 | Ogura et al. | 360/66 |

FOREIGN PATENT DOCUMENTS 59-51681  3/1984  Japan .
62-26911  2/1987  Japan .

OTHER PUBLICATIONS

English Translations of JP 59-51681 and 62-26911 provided by applicant.

Primary Examiner—Aristotelis M. Psitos
Attorney, Agent, or Firm—Robin, Blecker & Daley

[57] ABSTRACT

A magnetic recording or reproduction apparatus having a magnetic head, a reference clock signal source, a recording or reproducing signal processing system connected through a boosting transformer to the magnetic head, means for supplying an erasing signal to the magnetic head through the transformer, and a motor for rotating a recording or record bearing medium relative to the magnetic head, wherein the erasing signal is obtained by dividing the frequency of the periodic signal produced from the reference clock signal source under the condition that the frequency of the erasing signal falls within the pass band of the boosting transformer and is so low as not to give any influence to the recorded signals. Another feature is that the frequency of the erasing signal is also related to the frequency of rotation of the record bearing medium relative to the magnetic head so that the erasing magnetic field has no stationary nodes on the recording track.

10 Claims, 2 Drawing Sheets

MAGNETIC RECORDING OR REPRODUCTION APPARATUS WITH ERASING CAPABILITY

1. Field of the Invention

This invention relates to a magnetic recording or reproduction apparatus, and more particularly to a magnetic recording or reproduction apparatus having erasing means of simple circuit construction capable of high erasing performance.

2. Description of the Related Art

The conventional erasing devices in the magnetic recording or reproduction apparatus for recording video signals or like information on the magnetic discs or the like, or reproducing the recorded information from the record bearing media, may be classified into the following main groups:

(a) The bulk erasing device which erases all tracks at once.

(b) Besides the recording or reproducing head, another or erasing head is used and the erasing signal is in the form of alternating or direct current.

(c) The recording or reproducing head is utilized in erasing by applying a direct current thereto which is gradually attenuated while alternating between opposite polarities.

Of these, the device (a) cannot erase the desired track alone. The device (b), having two heads, makes the head mechanism complicated. The device (c) requires a considerably long time to complete the erasing with perfect removal of the residual magnetization.

The present inventor has previously proposed an erasing device which has overcome the above-described problems and in which the erasing signal for application to the magnetic head is made to include a continuous oscillation (in a period $T_{E1}$ of FIG. 3) of low frequency outside the frequency band of the recording or reproducing signal and an attenuating oscillation (in a period $T_{E2}$ of the same figure) that follows, thereby the erasing can be performed in each recording track with a wider width than that of the recording track and a higher efficiency, in U.S. patent application Ser. No. 931,895, which is a continuation of U.S. Patent Application Ser. No. 560,413 filed Dec. 12, 1983 now abandoned (corresponding to Japanese Laid-Open patent application No. Sho 59-110008).

Another previous proposal of the present inventor is that, as is applicable to the erasing device of the type described in the U.S. patent application Ser. No. 560,413, and further to the general or alternating current type of erasing device, the erasing signal that is supplied to the magnetic head to form an erasing magnetic field is made up from the output of the horizontal synchronizing signal source by dividing its frequency, and, concerning the relationship between the frequency of rotation of the record bearing medium relative to the magnetic head and the frequency of the erasing signal, a condition is set forth that the erasing magnetic field on the recording track of the medium has no stationary nodes, with advantages that, due to no necessity of providing an additional signal generator solely used for erasing purposes, the circuitry of the erasing device can be constructed in a simple form, that the frequency accuracy of the erasing signal is heightened, that the erasing magnetic field is effective at all points on the recording track, and that the time necessary to complete the efficient erasing can be shortened, in U.S. patent application Ser. No. 701,421 filed Feb. 14, 1985 (corresponding to Japanese Laid-Open patent application No. Sho 59-29278).

SUMMARY OF THE INVENTION

This invention has its basic feature in the invention of the above-identified U.S. patent application Ser. No. 701,421 corresponding to Japanese patent application No. Sho 59-29278, and its object is to eliminate the problem that arises when the above-identified previous invention is applied to the magnetic recording or reproduction apparatus of the type in which the magnetic head such as 2-channel thin film head is connected through a boosting transformer to the recording or reproducing signal processing system. A specific feature of the present invention is that the frequency of the erasing signal is so chosen as to be suited to the transmission characteristic of the boosting transformer.

Another object of the present invention is to provide a magnetic recording or reproduction apparatus comprising a magnetic head, a reference clock signal source, means for supplying an erasing signal to the magnetic head through a boosting transformer connected between the magnetic head and a recording or reproducing signal processing system, and means for rotating a record bearing medium relative to the magnetic head, in which the erasing signal can pass through the boosting transformer without suffering deterioration of the transmission characteristic, the frequency accuracy of the erasing signal is high, and a high-efficiency erasing can be performed.

In an embodiment of the invention as applied to the magnetic recording or reproduction apparatus of the type having a magnetic head, a reference clock signal source, means for supplying an erasing signal to the magnetic head through a boosting transformer connected between the magnetic head and a recording or reproducing signal processing system, and means for rotating a record bearing medium relative to the magnetic head, to achieve the above-stated objects, the erasing signal is obtained by dividing the frequency of a periodic output signal produced from the reference clock signal source, while its frequency is so chosen as to fall within the pass band of the boosting transformer and so low as not to influence the recorded signals, and the frequency of the erasing signal is also so related to the frequency of rotation of the record bearing medium relative to the magnetic head that no stationary nodes of an erasing magnetic field are formed on the recording track.

The above-described features of the invention enable the magnetic recording or reproduction apparatus to produce advantages that the erasing signal is supplied to the magnetic head while the transmission characteristic being not deterioratively affected by the boosting transformer, that the frequency accuracy of the erasing signal is maintained high, and that the desired recording track can be thoroughly and reliably erased.

Other objects and features of the invention will become apparent from the following description and drawings.

DETAILED DESCRIPTION OF THE PREFERRED EMBODIMENT

The present invention is next described in detail in connection with embodiment thereof by reference to the drawings. The following description goes in the order of the construction and arrangement of the components of the magnetic recording or reproduction apparatus, a practical example of the synchronizing signal generator, the operation of that apparatus, and another embodiment of the invention.

How to construct the magnetic recording or reproduction apparatus of the invention is first described with reference to FIGS. 1 and 3.

Figure 1:
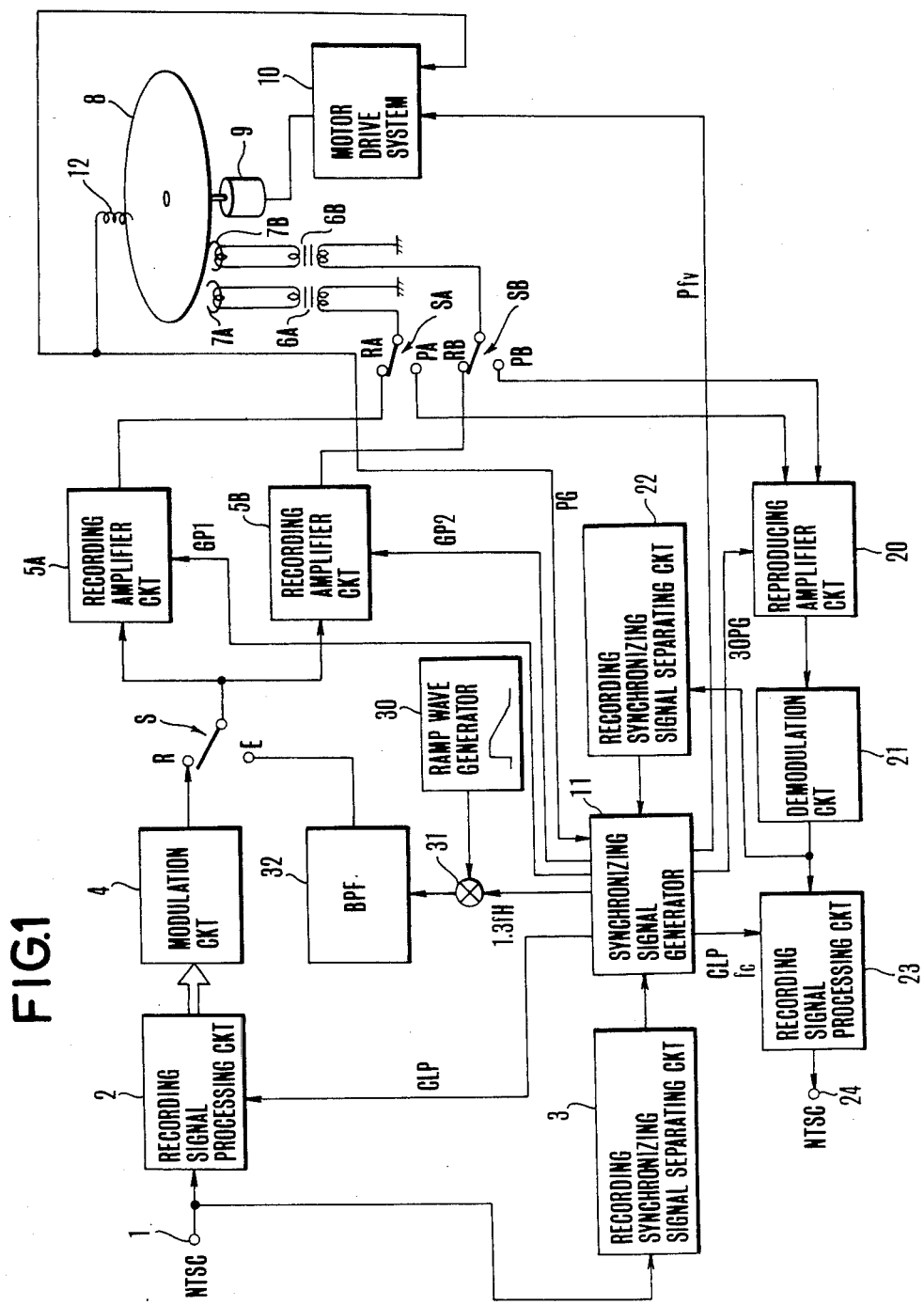
FIG. 1 is a schematic diagram, partly in block form, of an embodiment of the magnetic recording or reproduction apparatus according to the present invention.

In FIG. 1 there is shown one embodiment of the invention applied to the still picture recording and reproduction apparatus using a magnetic disc as the record bearing medium. A standard television signal or NTSC signal entering at an input terminal 1 is converted to signals suited to be recorded, for example, a luminance signal Y and color difference signals (R-Y) and (B-Y) by a recording signal processing circuit 2. A synchronizing signal is separated out of the NTSC signal by a recording synchronizing signal separating circuit 3, and is supplied to a synchronizing signal generator 11 in order that the generator 11 is synchronized with the NTSC signal. The luminance and color difference signals are FM-modulated by a modulation circuit 4 to form a recording signal. S is a recording/erasing mode selector switch. Two recording amplifier circuits 5A and 5B for a 2-channel head 7 are controlled selectively for every one field, that is, every one revolution of a magnetic disc 8 by gating pulses GP1 and GP2 which are formed by the synchronizing signal generator 11 based on a PG pulse produced from a PG coil 12 each time the magnetic disc 8 rotates one revolution with its speed being 3,600 rpm. Recording/reproducing mode selector switches SA and SB have their throws RA and RB connected to the outputs of the recording amplifier circuits 5A and 5B respectively, and their movable poles connected to respective primary coils of booster transformers 6A and 6B, the secondary coils of which are connected to thin film heads 7A and 7B as the magnetic head respectively. The thin film heads 7A and 7B constitute a 2-channel head, and each is constructed with an element of magnetic material deposited on a substrate (not shown) by lithography techniques. The output signals of the amplifier circuits 5A and 5B are selectively recorded in respective concentric tracks on the magnetic disc 8 by the thin film heads 7A and 7B. An electric motor 9 rotates the magnetic disc 8. When in the recording mode, a motor drive system 10 controls the operation of the motor 9 in accordance with the vertical synchronizing signal from the recording synchronizing signal separating circuit 3. When in reproduction mode, vertical synchronizing pulses Pfv from the synchronizing signal generator 11 and the PG pulses from the PG coil 12 are given to the motor drive system 10 so that the motor 9 rotates at a constant speed of, for example, 3,600 rpm, while its phase of rotation is synchronized with the PG pulse.

A reproducing amplifier circuit 20 has three inputs, two of which are connected to the other throws PA and PB of the switches SA and SB respectively, and the other of which is supplied with a train of pulses of 30 Hz with a duty ratio of 50% from the synchronizing signal generator 11, as they are produced on the basis of the PG pulse from the PG coil 12. As the field is changed over by the pulse 30 PG, a continued frame reproducing output is obtained. This output is demodulated by a demodulation circuit 21. A synchronizing signal including a time-axis variation is separated out of the output of the demodulating circuit 21 by a reproducing synchronizing signal separating circuit 22. A color subcarrier fc formed based on that synchronizing signal by the synchronizing signal generator 11, and various synchronizing signals are supplied to a reproducing signal processing circuit 23 which then produces a standard television signal, for example, NTSC signal. This signal appears at an output terminal 24, and therefrom is applied to an external output device, for example, a monitor, or printer.

The synchronizing signal generator 11, a ramp wave generator 30, a multiplier 31 and a band-pass filter 32 constitute an erasing signal forming circuit which is an essential feature of the invention. The synchronizing signal generator 11 produces a periodic output signal whose frequency is, for example, 1.3 fH (where $f_H$ is the frequency of the horizontal synchronizing signal). This signal is multiplied by a ramp wave from the ramp wave generator 30 in the multiplier 31 to obtain an erasing signal having a continuous oscillation (with a period $T_{E1}$) followed by an attenuating oscillation whose envelopes are linear (with a period $T_{E2}$) as shown in FIG. 3. The erasing signal is passed through the band-pass filter 32 to a throw E of the recording/erasing changeover switch S. For note, the significance of the value of frequency or 1.3 fH will be explained later.

Figure 3:
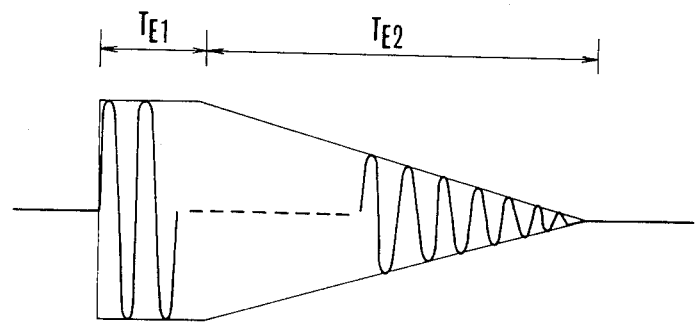
FIG. 3 is a waveform of the erasing signal usable in the apparatus of FIG. 1.

The values of the periods $T_{E1}$ and $T_{E2}$ of FIG. 3 may be, for example, about 0.1 and 0.3 sec. respectively. To obtain the erasing signal shown in FIG. 3, besides the above-described circuit, modifications are possible such as those, for example, disclosed in Japanese Laid-Open patent application No. Sho 57-110008 and Japanese patent application No. Sho 60-166306 which are both assigned to the assignee of the present invention.

For note, in case when this invention is applied to a single apparatus, namely, recorder or reproduction apparatus, the boosting transformer is provided either between the magnetic head and the recording amplifier circuit, or between the magnetic head and the reproducing amplifier circuit. In either apparatus, it is through this boosting transformer that the erasing signal is supplied to the magnetic head.

Figure 2:
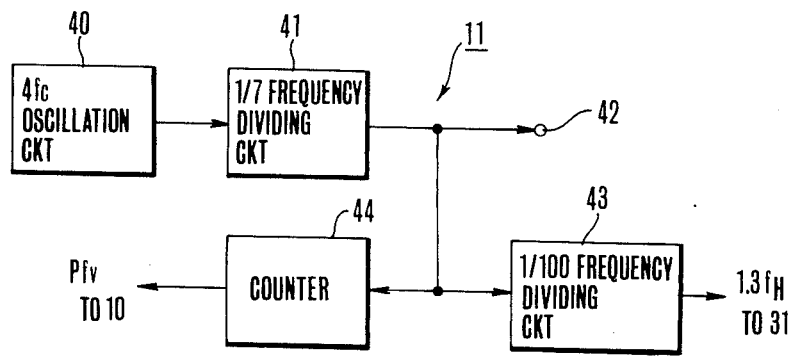
FIG. 2 is a block diagram illustrating the details of the main parts of the synchronizing signal generator of FIG. 1.
Figure 4:
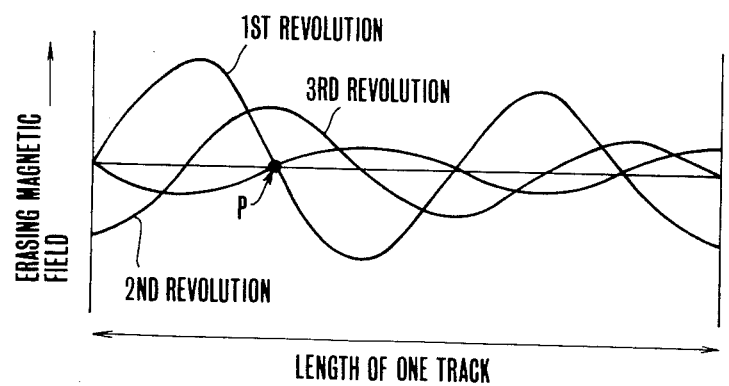
FIG. 4 is a graph considered to explain the erasing magnetic field in the apparatus of FIG. 1.

(A practical example of the synchronizing signal generator in this embodiment of the invention) (FIG. 2, FIG. 4).

FIG. 2 illustrates the details of the main parts of the synchronizing signal generator 11 of FIG. 1. A 4fc oscillation circuit 40 as the reference clock signal source (where fc is the color subcarrier) produces oscillation of, for example, 14.31818 MHz. This frequency is then divided by 7 in a frequency dividing circuit 41 to obtain an intermediate reference signal of $130 f_H = 130 \times 15.734$ KHz. This intermediate reference signal is used as the standard for various synchronizing pulses and is directed to an outlet 42. It is further divided by 100 in another frequency dividing circuit 43 to obtain the above-described periodic signal of 1.3 fH which is then applied to the multiplier 31. A 16-stage counter 44 that counts 34,124 pulses from the 1/7 frequency dividing circuit 41 in each period, produces a signal of 59.94 Hz.

Based on this signal, a vertical synchronizing pulse train Pfv which is given to the motor drive system 10 when in the reproduction mode is formed. For note, as the reference clock signal source, instead of the built-in oscillation circuit 40, a signal source of another device can be used.

One of the reasons why the frequency of the above-identified periodic signal, or the frequency $f_E$ of the erasing signal, is determined to be $1.3f_H$ is that the condition that it falls within the pass band of the boosting transformer 6A, 6B, and it is so low as not to influence a the signals which had been FM-modulated by the modulation circuit 4 and were recorded, and the condition that it is related to the frequency fv of rotation of the motor 9, and, therefore, the magnetic disc 8, so that, as shown in FIG. 4, the erasing magnetic field has no stationary nodes due to NS inversion, when all revolutions (1st revolution, 2nd revolution, . . . , n-th revolution) of the magnetic disc 8 are summed up, or $$f_E \neq k/2 \cdot fv \text{ (k is a positive integer)} \quad (1)$$

are satisfied.

Another reason is that the erasing signal of 1.3H can be very easily formed, for all what must be done is only to divide the above-stated standard reference signal of $130\ f_H$ by 100. To allow for passage of the erasing signal of such low frequency, the boosting transformer 6A, 6B is made up by using a ferrite of Mn—Zn in the transformer core and by increasing the number of turns of wire so that the cutoff frequency $f_L$ on the low band side is lowered. That is, the following condition is satisfied:

$$f_E > f_L \quad (2)$$

Also even the following condition is satisfied:

$$f_E < f_{VL} \quad (3)$$

were $f_{VL}$ is the lower limit of the band of recording or reproducing frequencies.

And, the erasing signal of 1.3 $f_H$=20.454 KHz can be supplied to the thin film heads 7A and 7B without suffering substantial deterioration of the transmission characteristic due to the boosting transformers 6A and 6B. Also, since 1.3 $f_H$=341.25$f_v$, the relationship of equation (1) is satisfied. (Though a node of the erasing magnetic field takes place at, for example, a point P of FIG. 4 in the 1st and 3rd revolutions, it is in the 2nd revolution that this point P has no node, in other words, does not become a stationary node). Further, the erasing signal can be easily made up by dividing 130 $f_H$ by 100. For note, since the erasing signal $f_E$ and the rotation frequency fv of the magnetic disc are in synchronism, even if the vertical synchronizing pulse Pfv (the output of the synchronizing signal generator 11) which determines the rotation frequency fv varies, the relationship shown in FIG. 4 is maintained.

As the frequency $f_E$ of the erasing signal, besides $1.3f_H$, use may be made of a higher frequency such as $3.9f_H$ (61.362KHz) or $6.5f_H$ (102.27KHz), provided that the condition (1) is satisfied. Particularly when the use of $1.3f_H$ causes a large loss on the transmission characteristic of the boosting transformers 6A and 6B, it is better to change it to one of these higher values of frequency. But, if the frequency $f_E$ of the erasing signal is too high, the high frequency wave which cannot be removed by the band pass filter 32 remains in the erased area of the record bearing medium and will influence a video signal to be recorded on that erased area. Therefore, there is an upper limit on determination of the frequency $f_E$.

Though not shown in FIG. 2, for the recording signal processing circuit 2 when in the recording mode, or for the reproducing signal processing circuit 23 when in the reproduction mode, the synchronizing signal generator 11 of FIG. 1 supplies a clamp pulse (CLP) of phase synchronization based on the synchronizing signal separated by the recording synchronizing signal separating circuit 3 or the reproducing synchronizing signal separating circuit 22 respectively in order to set a direct current level.

The operation of the embodiment shown in FIG. 1 is explained below. When in the recording mode, the standard television signal from the input terminal 1 is separated into a luminance signal Y and a color signal which is then converted to color difference signals (R-Y) and (B-Y) by the recording signal processing circuit 2. These luminance and color difference signals are FM-modulated by the modulation circuit 4 to form a recording video signal. This video signal passes through the throw R of the switch S to the recording amplifier circuits 5A and 5B. Responsive to the gating pulses GP1 and GP2 from the synchronizing signal generator 11, the amplifier circuits 5A and 5B produce output signals selectively for each field, which are then applied through the respective mode selector switches SA and SB at the throws RA and RB and the respective boosting transformers 6A and 6B to the thin-film magnetic heads 7A and 7B respectively, being recorded in a concentric track for each field on the magnetic disc 8. Meanwhile, as for the motor 9 rotating the magnetic disc 8, the vertical synchronizing pulse Pfv formed in the synchronizing signal generator 11 based on the vertical synchronizing signal separated by the recording synchronizing signal separating circuit 3 is given to the motor drive system 10 where the PG pulse and the vertical synchronizing pulse Pfv are synchronized with each other, and, moreover, the speed of rotation of the motor 9 is controlled to a constant value of, for example, 3,600 rpm.

When in the reproduction mode, the video signals recorded on the magnetic disc 8 are read out by the thin film heads 7A and 7B, and their outputs are applied through the boosting transformers 6A and 6B and the selector switches SA and SB at the throws PA and PB to the reproducing amplifier circuit 20. As the field-changing over is carried out by the periodic pulses 30PG formed in the synchronizing signal generator 11 based on the PG pulses generated in the PG coil 12, a series of continuous reproducing outputs for a frame are obtained. After demodulation by the demodulation circuit 21, the reproducing synchronizing signal separating circuit 22 produces a synchronizing signal including time-axis variation, on the basis of which the synchronizing signal generator 11 produces the color subcarrier fc. The subcarrier fc and the various synchronizing pulses are supplied to the reproducing signal processing circuit 23 where a standard television signal is reproduced. This signal is outputted from the output terminal 24 to an external output device such as a TV monitor, video printer, or VTR. The vertical synchronizing pulses Pfv given to the motor drive system 10 when in the reproduction mode is formed based on the output of the counter 44 of FIG. 2, for example, a frequency-divided signal of 59.94Hz.

When in the erasing mode, the operator sets the selector switch S in the E position. The periodic signal of $1.3f_H$ (or $3.9f_H$ and $6.5f_H$) from the synchronizing signal generator 11 is multiplied by the ramp wave from the ramp wave generator 30 in the multiplier 31 to form the erasing signal shown in FIG. 3. This is supplied through the band-pass filter 32, the throw E of the switch S, the recording amplifier circuits 5A, 5B, the throws RA and RB of the selector switches SA and SB, and the boosting transformers 6A and 6B to the thin film heads 7A and 7B constituting the 2-channel head to erase the signals recorded on the magnetic disc 8 from track to track. How to erase the recorded signals is explained by reference to FIG. 3. During the continuous oscillation period $T_{E1}$, the magnetization at and near a recording track which is intended to be erased is saturated by the erasing signal whose amplitude is constant, so that the original recording signal is superimposed thereon to erase it. Then, during the attenuating period $T_{E2}$ when an amplitude linearly decreases to zero, the residual magnetization is removed. It should be pointed out that the use of the signal of such form as shown in FIG. 3 as the erasing signal is not essential to the present invention, and the present invention is applicable to the generally accepted alternating current type of erasing device.

Because the frequency $f_E$ (for example, $1.3f_H$, $3.9f_H$, $6.5f_H$) of the erasing signal is set to be so low as has been described above, it can be transmitted to the thin film heads 7A and 7B without accompaniment of a deterioration of the transmission characteristic of the boosting transformers 6A and 6B. Further, because the erasing signal is obtained by dividing the frequency of the output of the reference clock signal source of high frequency accuracy, there is little residual noise. Also, with the help of the band-pass filter 32, an unnecessary high frequency wave which will become residual noise within the limitations of the relationship of the transmission characteristic of the boosting transformers 6A and 6B and the frequency $f_E$ of the erasing signal as has been described above, can be removed. Further, because the frequency $f_E$ of the erasing signal is determined according to the rule of equation (1), for all revolutions of the magnetic disc 8, the stationary nodes of the erasing magnetic field do not arise at any point on the recording track as shown in FIG. 4. Further, because the output of $1.3f_H$ from the frequency dividing circuit 43 of FIG. 2 and the output Fv of the counter 44 are synchronized, even if the vertical synchronizing pulse Pfv for the motor drive system 10 varies, because $1.3f_H$ varies in accompaniment therewith, the relationship shown in FIG. 4 is maintained on the recording track of the magnetic disc 8.

(Another embodiment of the magnetic recording or reproduction apparatus according to the present invention).

In the video tape recorder using a magnetic tape, as the means for recording or reproducing a standstill picture, besides a video camera by which a photograph taken by using a silver halide film and the video tape recorder by which the output of the video camera is recorded, it is also possible to remove the necessity of using the film, but to shoot an object to the photographed directly by the video camera, and record the video signal from the camera. For this purpose, (a) Recording is performed in a series of continuous picture frames as usual, but when in the reproduction mode, while the tape being stopped, a still picture is viewed.

(b) Using a frame memory or the like, the same signal was recorded in a number of frames, and when in the reproduction mode, the tape is stopped to view it as a still picture. Or that area of the tape which has the same signal is reproduced repeatedly.

Other methods may be considered. The assignee of the present invention has previously proposed a recording apparatus in Japanese Laid-Open patent application No. Sho 59-51681 where the record bearing medium runs while obliquely winding round a guide, and the rotating recording head scans the recording medium to record the video signals, wherein means is provided for giving the recording head a displacing force of direction across the scanning direction so that the scanning locus of the recording head becomes substantially the same between when running and when stopping, thereby a still picture of good image quality can be reproduced.

This invention can be applied to erase the recorded signals in the above-described type of recording apparatus where the head is rotated relative to the magnetic tape. When the conditions that the erasing signal is obtained by dividing the frequency of the periodic signal produced from the reference clock signal source, that its frequency falls within the pass band of the boosting transformer, and is so low as to give no influence to the recorded signals, and that the frequency of the erasing signal and the frequency of rotation of the head (if a plurality of heads are used, the frequency of rotation of the head is determined by taking into account of the number of heads) satisfy the relationship represented by the equation (1), similar results to those described above can be expected.

As has been described above, according to this invention, the erasing signal is supplied to the magnetic head without suffering deterioration of the transmission characteristic due to the boosting transformer, and the frequency accuracy of the erasing signal is very high, permitting no stationary nodes of an erasing magnetic field to be formed at any point on the recording track for all rotation of the magnetic head and the record bearing medium relative to each other. Thus, it is made possible to perform erasing with high accuracy and reliability by a circuit of simple structure.

What is claimed is:

1. A magnetic recording or reproduction apparatus comprising:
   (a) magnetic head means for recording or reproducing a first signal of a prescribed frequency band whose lower limit is $f_{VL}$ on or from a magnetic recording medium,
   said magnetic head means including an electromagnetic transducer element and transformer means for transforming the input or output signal to or from said electro-magnetic transducer element, and said transformer means having a prescribed frequency characteristic whose lower limit pass frequency is $f_L$;
   (b) drive means for displacing said magnetic recording medium and said magnetic head relative to each other;
   (c) a reference clock signal source;
   a first frequency dividing means for forming a signal of first frequency fv by dividing the frequency of the reference clock signal from said reference clock signal source;

(e) a second dividing means for forming a signal of second frequency $f_E$ by dividing the frequency of the reference clock signal from said clock signal source, said frequency satisfying the following conditions:

$f_E \neq k/2 \cdot f_V$ (k is a positive integer)

$f_L < f_E < f_{VL}$; and (f) control means for controlling said drive means periodically in accordance with said first frequency signal, and for supplying said second frequency signal to said electro-magnetic transducer element through said transformer means.

2. An apparatus according to claim 1, wherein said electro-magnetic transducer element includes a thin film magnetic head.

3. An apparatus according to claim 1, wherein said transformer means includes a step-up transformer.

4. An apparatus according to claim 1, wherein said drive means displaces said magnetic recording means by rotation relative to said magnetic head means.

5. An apparatus according to claim 1, wherein said first signal is a signal obtained by frequency modulation of a video signal.

6. An apparatus according to claim 5, wherein said video signal includes a horizontal synchronizing signal whose period if $1/f_H$.

7. An apparatus according to claim 6, wherein said reference clock signal source produces a clock signal of frequency of $910 \times f_H$.

8. An apparatus according to claim 7, wherein said first frequency-dividing means forms a signal of $f_V = f_H/262.5$ from said clock signal.

9. An apparatus according to claim 8, wherein said second frequency-dividing means forms a signal of $f_E = 1.3 f_H$ from said clock signal.

10. A magnetic head device comprising:
 (a) a thin film magnetic head for recording FM-modulated video signals on a disc-shaped magnetic recording medium;
 (b) a boosting transformer having a low frequency cut off frequency $f_l$ for stepping up the signal voltage reproduced by said thin film magnetic head;
 (c) rotation control means for rotating said disc-shaped recording medium with a first period of $1/f_V$; and
 (d) erasing means for supplying an erasing signal of frequency $f_E$ to said thin film magnetic head through said boosting transformer, whereby $f_E$ satisfies the following conditions:

$f_E \neq k/2 \cdot f_V$ (k is a positive integer)

$f_E$ is a low frequency signal outside the frequency band of the FM-modulated video signals $f_E$ is higher than the low-frequency cutoff frequency of the boosting transformer.

* * * * *